United States Patent
Soddemann et al.

(10) Patent No.: US 11,745,450 B2
(45) Date of Patent: Sep. 5, 2023

(54) METHOD FOR MANUFACTURING A BEVERAGE CAPSULE WITH SEALING RING

(71) Applicant: Dätwyler Schweiz AG, Schattdorf (CH)

(72) Inventors: Matthias Soddemann, Schattdorf (CH); Sebastian Walker, Erstfeld (CH)

(73) Assignee: Dätwyler Schweiz AG, Schattdorf (CH)

(*) Notice: Subject to any disclaimer, the term of this patent is extended or adjusted under 35 U.S.C. 154(b) by 398 days.

(21) Appl. No.: 17/011,126

(22) Filed: Sep. 3, 2020

(65) Prior Publication Data

US 2021/0060877 A1 Mar. 4, 2021

(30) Foreign Application Priority Data

Sep. 4, 2019 (CH) .................................. 01111/19

(51) Int. Cl.
*B29C 70/80* (2006.01)
*B65D 85/804* (2006.01)
(Continued)

(52) U.S. Cl.
CPC .......... *B29C 70/80* (2013.01); *B65D 85/8043* (2013.01); *B29L 2031/565* (2013.01); *B29L 2031/7174* (2013.01)

(58) Field of Classification Search
CPC ................ B29C 70/80; B65D 85/8043; B29L 2031/565; B29L 2031/7174
(Continued)

(56) References Cited

U.S. PATENT DOCUMENTS

| 8,202,560 B2 * | 6/2012 | Yoakim | B65D 85/8064 426/77 |
| 2010/0245474 A1 * | 9/2010 | Okubo | B41J 2/14145 347/44 |

(Continued)

FOREIGN PATENT DOCUMENTS

| DE | 20 2009 009125 U1 | 9/2010 |
| EP | 1654966 A1 | 5/2006 |

(Continued)

OTHER PUBLICATIONS

Swiss search report for CH 1111/2019 dated Mar. 17, 2020.
European Search Report for EP20193668.9, dated Nov. 23, 2020 (24 pages).

*Primary Examiner* — Omar Flores Sanchez
(74) *Attorney, Agent, or Firm* — Paul D. Bianco; Fleit Intellectual Property Law

(57) ABSTRACT

A method for manufacturing a beverage capsule with an outer sealing ring comprised of elastic material involves the following steps: (a) providing a capsule body with a peripheral, flange-like edge for attaching a sealing film; (b) providing a sealing ring comprised of elastic material and adjusted to the flange-like edge; (c) placing the sealing ring and the capsule body in a capsule mount of a sealing device for sealing the capsule body with the sealing film, with the sealing ring arranged between the capsule mount and the flange-like edge of the capsule body; (d) filling the capsule body with a beverage substrate; and sealing the capsule body with the sealing film and simultaneously fastening the sealing ring to the flange-like edge using the sealing device.

12 Claims, 2 Drawing Sheets

(51) Int. Cl.
*B29L 31/56* (2006.01)
*B29L 31/00* (2006.01)

(58) Field of Classification Search
USPC .......................................................... 99/295
See application file for complete search history.

(56) References Cited

U.S. PATENT DOCUMENTS

| | | | |
|---|---|---|---|
| 2011/0247975 A1* | 10/2011 | Rapparini | B65D 85/8061 |
| | | | 210/321.6 |
| 2014/0186498 A1* | 7/2014 | Dogan | B65D 85/804 |
| | | | 426/115 |
| 2018/0272736 A1* | 9/2018 | Tadachi | B41J 2/17509 |
| 2020/0180858 A1* | 6/2020 | Krüger | B65D 85/8043 |
| 2021/0187881 A1* | 6/2021 | Bambagioni | B29C 45/14336 |

FOREIGN PATENT DOCUMENTS

| | | | |
|---|---|---|---|
| EP | 1839543 A1 | 10/2007 |
| EP | 1849715 A1 | 10/2007 |
| EP | 2012994 A1 | 1/2009 |
| EP | 2070828 A1 | 6/2009 |
| EP | 2151313 A1 | 2/2010 |
| EP | 2279845 A2 | 2/2011 |
| EP | 2381199 A2 | 10/2011 |
| WO | 2017/106191 A1 | 6/2017 |
| WO | 2019/01995 A1 | 1/2019 |
| WO | 2019/081363 A1 | 5/2019 |

* cited by examiner

METHOD FOR MANUFACTURING A BEVERAGE CAPSULE WITH SEALING RING

FIELD OF THE INVENTION

The invention relates to a method for manufacturing a beverage capsule with an outer sealing ring comprised of elastic material.

BACKGROUND

Beverage capsules for preparing a beverage out of a beverage substrate contained in the capsule are known. The best-known example is the Nespresso® capsule. The beverage capsules typically consist of a solid capsule body filled with the substrate, the fill opening of which is sealed with a film. In order to attach the sealing film, the capsule body has a peripheral, flange-like edge. To allow the beverage capsule to be held sealed in the beverage-making machine, the peripheral, flange-like edge is provided with a sealing means on the side lying opposite the sealing film.

Such sealing means are available in a variety of versions, and they are either molded into the flange-like edge (e.g., grooves and ribs) or secured to the flange-like edge as a separate sealing element.

The sealing means secured as a separate sealing element typically consist of an annular elastic material.

Known from EP2151313 and EP2381199 are a respective method for applying a rubber-elastic sealing element on the flange-like edge, in which a sealing composition that has not been hardened is applied to the edge in a liquid or viscous state. The sealing composition is subsequently heated and hardened. While the method does deliver capsules with good seals, the capsules are very time-consuming to manufacture as a whole. WO19001995 likewise describes a capsule in which the sealing element is applied in a viscous or liquid form. Known from WO19081363A1 is a similar method, in which a thermoplastic is applied in a liquid state. All of these methods are expensive, and require devices specially developed for this purpose to apply the seal in a liquid form.

EP1654966 and EP1839543 each describe a capsule with a sealing element comprised of rubber-elastic material. The sealing element is attached to the flange-like edge through adhesive bonding, welding, or compression.

EP1849715, EP2012994 and EP2279845 each describe a method for fastening a sealing element to a capsule comprised of aluminum, in which the sealing element is fastened while bending the outermost part of the flange-like edge.

EP2070828 describes a capsule with sealing ring, which is attached to the container after the portion pack has been filled and sealed, so that it is not exposed to the high temperatures that arise while filling and sealing the portion pack.

Known from DE202009009125U1 is a capsule in which the user him or herself applies a sealing ring as needed.

Beverage capsules are manufactured in enormously high quantities. Therefore, any time economized during manufacture—even if only a few seconds per capsule—lead to major cost savings.

SUMMARY OF THE INVENTION

One aspect of the invention relates to a method for manufacturing a beverage capsule that has good sealing properties while still being cost-effective to manufacture.

In one embodiment, the method for manufacturing a beverage capsule with an outer sealing ring comprised of elastic material involves the following steps: (a) providing a capsule body with a peripheral, flange-like edge for attaching a sealing film; (b) providing a sealing ring comprised of elastic material and adjusted to the flange-like edge; (c) placing the sealing ring and the capsule body in a capsule mount of a sealing device for sealing the capsule with the sealing film, wherein the sealing ring is arranged between the capsule mount and the flange-like edge of the capsule body; (d) filling the capsule body with a beverage substrate; and (e) sealing the capsule body with the sealing film and simultaneously fastening the sealing ring to the flange-like edge.

Simultaneously fastening the sealing ring to the lower side (i.e., the side facing away from the sealing film) of the flange-like edge during the sealing step makes it possible to significantly shorten the manufacturing time for a beverage capsule.

In several embodiments, the sealing ring can consist of a material selected from the group comprising elastomers, thermoplastics, thermoplastic elastomers (TPE) (e.g., thermoplastic polyamide elastomers (TPA), thermoplastic copolyester elastomers (TPC), thermoplastic elastomers based on olefin (TPO), thermoplastic elastomers based on urethane (TPU) or thermoplastic vulcanizates or cross-linked thermoplastic elastomers based on olefin (TPV)).

Thermoplastic polyurethane is especially suitable. The advantage thereto in particular is that the sealing ring can be fastened directly to the flange-like edge during the thermal sealing process without any further pretreatment.

The sealing ring can preferably be stamped or cut out of a film. The film can have a thickness of 25 to 1000 micrometers, preferably of about 500 micrometers.

In several embodiments, the sealing ring can have an inner diameter that is smaller than an outer diameter of a capsule wall in the area of the flange-like edge, so that the sealing ring fastened after the sealing step partially abuts against the capsule wall.

In several embodiments, the sealing ring, which is placed in a solid state, can be plastically deformed during the sealing step. To this end, a surface of the upper edge of the capsule mount can be provided with a profiling, in order to obtain a profiled sealing ring.

In several embodiments, the capsule mount for the capsule body is configured in such a way as to provide a gap in the area of the flange-like edge of the capsule body between a conical capsule wall of the capsule body and an inner wall of the capsule mount, so that part of the material of the sealing ring can flow along the capsule wall while sealing the capsule body.

The invention further relates to a beverage capsule manufactured according to the method described above.

Alternatively, the sealing ring can be fastened before sealing the beverage capsule. The method for manufacturing a beverage capsule with an outer sealing ring comprised of elastic material then involves the following steps: (a) providing a capsule body with a peripheral, flange-like edge for attaching a sealing film; (b) providing a sealing ring comprised of elastic material and adjusted to the flange-like edge; and (c) placing the sealing ring and the capsule body in a capsule mount for fastening the sealing ring to the flange-like edge of the capsule body, wherein the sealing ring is arranged between the capsule mount and the flange-like edge of the capsule body; and (d) fastening the sealing ring through thermal compression with a counter-pressure element.

In several embodiments, the sealing ring can be plastically deformed during compression.

In several embodiments, an end face of the capsule mount can have a profiling that is transferred to the sealing ring during the sealing step.

In several embodiments, the capsule mount for the capsule body can be configured in such a way that a gap is present in the area of the flange-like edge of the capsule body between a conical capsule wall of the capsule body and an inner wall of the capsule mount, so that part of the material of the sealing ring can flow along the capsule wall while compressing the capsule body.

This alternative method for manufacturing a beverage capsule with a sealing ring can be regarded as an independent invention. A sealing ring can here be given the desired shape without any expensive equipment being required for applying a liquid material.

BRIEF DESCRIPTION OF THE DRAWINGS

The invention will be described in more detail below based on exemplary embodiments in conjunction with the drawing(s). Shown on.

WAYS OF IMPLEMENTING THE INVENTION

Figure 1:
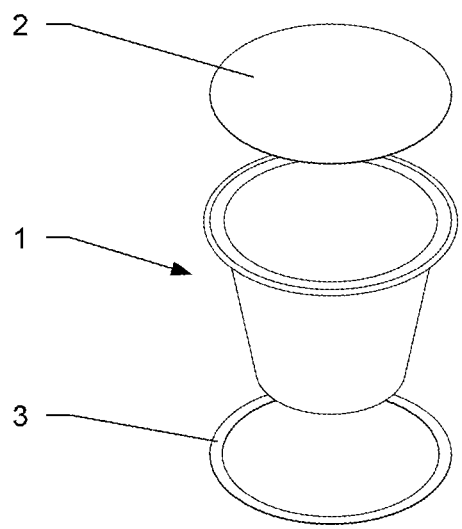
FIG. 1 is an exploded view of a beverage capsule.

FIG. 1 shows an exploded view of a Nespresso®-compatible beverage capsule comprising a capsule body 1 with a peripheral, flange-like edge 10, a sealing film 2 and a sealing ring 3. In the finished state, the capsule body 1 is filled with beverage substrate (not shown), and sealed with the sealing film 2, which is fastened to the flange-like edge 10 for this purpose. The sealing ring 3 is likewise fastened to the flange-like edge 10, specifically to the side lying opposite the sealing film 3.

Figure 2:
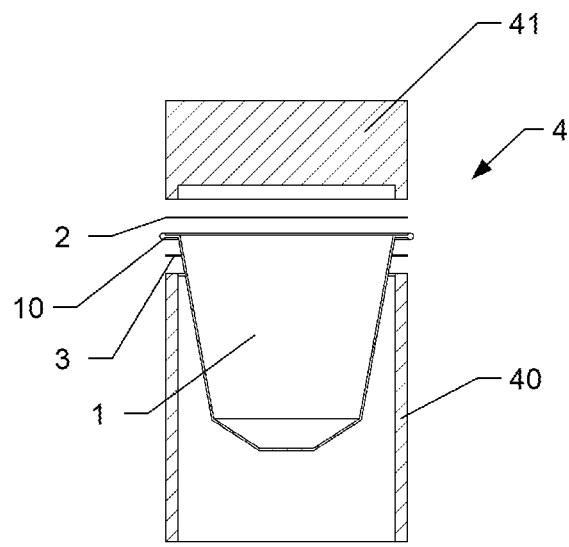
FIG. 2 is a sectional view of the beverage capsule on FIG. 1 with a sealing device.

FIG. 2 likewise shows an exploded view of the beverage capsule with the above three elements, and a schematically depicted sealing device 4 with a capsule mount 40 and sealing head 41.

FIGS. 3A to 3D shows steps (a) to (d) of a method for manufacturing a sealed beverage capsule with an outer sealing ring 3 comprised of elastic material.

Figures 3A, 3B, 3C:
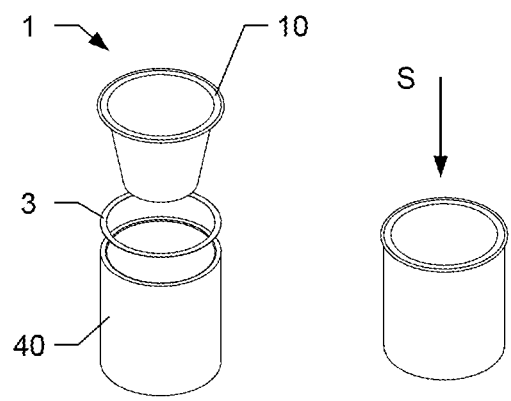
FIGS. 3A-3D are individual steps (a) to (d) of the method for manufacturing the beverage capsule.
Figure 3D:
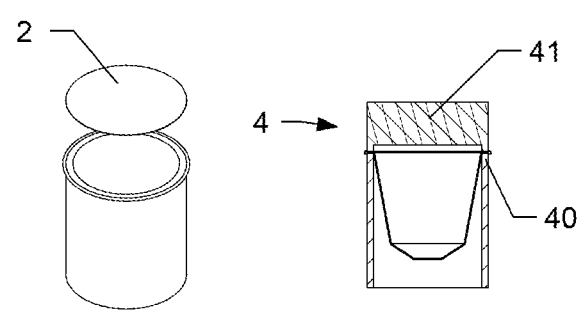

In a first step shown in FIG. 3A, the capsule body 1 and sealing ring 3 are provided, and then placed in the capsule mount 40 of the sealing device 4, so that the sealing ring 3 comes to lie between an upper edge or end face of the capsule mount 40 and the lower side of the flange-like edge 10.

As shown in FIG. 3B, beverage substrate S (arrow) is then filled into the capsule body 1. In a subsequent step shown in FIGS. 3C and 3D, the sealing film 2 is provided, and welded onto the upper side of the flange-like edge 10 of the capsule body 1 in the sealing device 4 by means of a sealing head 41. The sealing ring 3 is simultaneously fastened to the lower side of the flange-like edge 10 by the compression and/or thermal effect of the sealing device 4.

Figure 4:
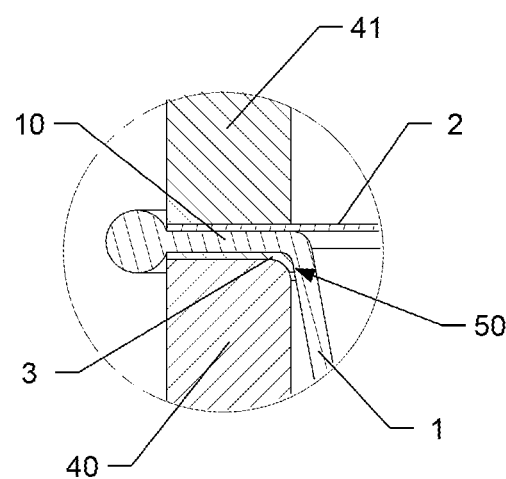
FIG. 4 is a detailed view of the sealing ring fastened to the capsule body.

FIG. 4 shows a detailed view of the beverage capsule in the sealing device. In the embodiment shown, the capsule mount 40 for the capsule body 1 is configured in such a way that a gap 50 is present in the area of the flange-like edge 10 of the capsule body 1 between a conical capsule wall 11 of the capsule body 1 and an inner wall of the capsule mount 40, so that part of the material of the sealing ring 3 is pressed along the capsule wall 11 during the sealing step. To ensure that the capsule body is well centered and fixed in the capsule mount 40, it can have a conical inner wall below the gap 50, against which the capsule body abuts.

REFERENCE LIST

1 Capsule body
2 Sealing film
3 Sealing element
4 Sealing device
10 Flange-like edge
11 Conical capsule wall
40 Capsule mount
41 Sealing head
50 Gap

The invention claimed is:

1. A method for manufacturing a beverage capsule with an outer sealing ring comprised of elastic material, the method comprising:
   providing a capsule body with a peripheral, edge for attaching a sealing film;
   providing a sealing ring comprised of elastic material and adjusted to the edge;
   placing the sealing ring and the capsule body in a capsule mount of a sealing device for sealing the capsule body with the sealing film, wherein the sealing ring is arranged between the capsule mount and the edge of the capsule body;
   filling the capsule body with a beverage substrate; and
   sealing the capsule body with the sealing film and simultaneously fastening the sealing ring to the edge by means of the sealing device.

2. The method according to claim 1, wherein the sealing ring is made out of an elastomer, thermoplastic or thermoplastic elastomer (TPE).

3. The method according to claim 1, wherein the sealing ring is made out of a thermoplastic polyurethane (TPU).

4. The method according to claim 1, wherein the sealing ring is stamped or cut out of a film.

5. The method according to claim 1, wherein the sealing ring has an inner diameter that is smaller than an outer diameter of a capsule wall in the area of the edge, so that the sealing ring fastened after the sealing step partially abuts against the capsule wall.

6. The method according to claim 1, wherein the capsule body is made out of aluminum.

7. The method according to claim 1, wherein the sealing ring plastically deforms during the sealing step.

8. The method according to claim 6, wherein an end face of the capsule mount has a profiling that is transferred to the sealing ring during the sealing step.

9. The method according to claim 1, wherein the capsule mount for the capsule body is configured in such a way that a gap is present in the area of the edge of the capsule body between a conical capsule wall of the capsule body and an inner wall of the capsule mount, so that part of the material of the sealing ring can flow along the capsule wall while sealing the capsule body.

10. A beverage capsule manufactured using the method according to claim 1.

11. A method for manufacturing a beverage capsule with an outer sealing ring comprised of elastic material, the method comprising:

providing a capsule body with a peripheral, edge for attaching a sealing film;

providing a sealing ring comprised of elastic material and adjusted to the edge; and placing the sealing ring and the capsule body in a capsule mount for fastening the sealing ring to the edge of the capsule body, wherein the sealing ring is arranged between the capsule mount and the edge of the capsule body; and fastening the sealing ring through thermal compression with a counter-pressure element, wherein the sealing ring plastically deforms during compression.

12. A beverage capsule manufactured using the method according to claim 11.

* * * * *